(12) United States Patent
Bedekar et al.

(10) Patent No.: US 9,031,047 B2
(45) Date of Patent: May 12, 2015

(54) METHOD AND APPARATUS FOR FACILITATE COMMUNICATIONS USING SURROGATE AND CARE-OF-INTERNET PROTOCOL ADDRESSES

(75) Inventors: Anand S. Bedekar, Arlington Heights, IL (US); Rajeev Agrawal, Northbrook, IL (US); Venkat Gopikanth, Buffalo Grove, IL (US); Suresh Kalyanasundaram, Bangalore (IN); Vishnu Ram Ov, Trivandrum (IN)

(73) Assignee: Google Technology Holdings LLC, Mountain View, CA (US)

( * ) Notice: Subject to any disclaimer, the term of this patent is extended or adjusted under 35 U.S.C. 154(b) by 887 days.

(21) Appl. No.: 11/913,939

(22) PCT Filed: Jun. 19, 2006

(86) PCT No.: PCT/US2006/023726
§ 371 (c)(1),
(2), (4) Date: Nov. 9, 2007

(87) PCT Pub. No.: WO2007/001948
PCT Pub. Date: Jan. 4, 2007

(65) Prior Publication Data
US 2008/0212562 A1 Sep. 4, 2008

(30) Foreign Application Priority Data
Jun. 21, 2005 (IN) .............................. 537/KOL/2005

(51) Int. Cl.
*H04W 4/00* (2009.01)
*H04J 3/24* (2006.01)
(Continued)

(52) U.S. Cl.
CPC ................ *H04W 8/26* (2013.01); *H04W 80/04* (2013.01); *H04W 88/005* (2013.01)

(58) Field of Classification Search
USPC .................... 370/338, 349, 395.52, 469, 401; 455/449, 509; 709/230, 239
See application file for complete search history.

(56) References Cited

U.S. PATENT DOCUMENTS

| | | | |
|---|---|---|---|
| 5,506,838 | A | 4/1996 | Flanagan |
| 6,195,555 | B1 | 2/2001 | Dent |

(Continued)

FOREIGN PATENT DOCUMENTS

| | | |
|---|---|---|
| EP | 0777396 A1 | 6/1997 |
| EP | 1259026 A1 | 11/2002 |

(Continued)

OTHER PUBLICATIONS

Wikipedia Article from Internet: "Global System for Mobile Communications", Apr. 17, 2005,http://web.archive.org/web/20050417021658/http://de.wikipedia.org/wiki/Global_System_for_Mobile_Communications, Mar. 27, 2008, pp. 1-13.

(Continued)

*Primary Examiner* — Alpus H Hsu
*Assistant Examiner* — Yee Lam
(74) *Attorney, Agent, or Firm* — Faegre Baker Daniels LLP (57) ABSTRACT

A wireless access point (300A, 300B, 300C) provides (101) a surrogate Internet Protocol address to use on behalf of a mobile station (401). That wireless access point then uses (102) that surrogate Internet Protocol address along with its own Internet Protocol address to facilitate establishing one or more data tunnels as necessary to support the communication needs of the mobile station.

11 Claims, 3 Drawing Sheets

(51) Int. Cl.
*H04L 12/28* (2006.01)
*H04J 3/16* (2006.01)
*H04J 3/22* (2006.01)
*H04W 40/00* (2009.01)
*H04B 7/00* (2006.01)
*G06F 15/16* (2006.01)
*G06F 15/173* (2006.01)
*H04W 8/26* (2009.01)
*H04W 80/04* (2009.01)
*H04W 88/00* (2009.01)

(56) References Cited

U.S. PATENT DOCUMENTS

| | | |
|---|---|---|
| 6,230,012 B1* | 5/2001 | Willkie et al. ............ 455/435.1 |
| 6,285,880 B1 | 9/2001 | Gagnon et al. |
| 6,430,698 B1 | 8/2002 | Khalil et al. |
| 6,473,413 B1 | 10/2002 | Chiou et al. |
| 6,567,664 B1 | 5/2003 | Bergenwall et al. |
| 6,578,085 B1 | 6/2003 | Khalil et al. |
| 6,711,408 B1 | 3/2004 | Raith |
| 6,721,565 B1 | 4/2004 | Ejzak et al. |
| 6,795,857 B1 | 9/2004 | Leung et al. |
| 6,795,891 B2 | 9/2004 | Lin |
| 6,813,501 B2 | 11/2004 | Kinnunun et al. |
| 6,859,653 B1 | 2/2005 | Ayoub et al. |
| 6,977,938 B2 | 12/2005 | Alriksson et al. |
| 7,016,682 B2 | 3/2006 | Won et al. |
| 7,096,273 B1 | 8/2006 | Meier |
| 7,139,833 B2* | 11/2006 | Heller ............ 709/238 |
| 7,162,529 B2 | 1/2007 | Morishige et al. |
| 7,289,463 B2 | 10/2007 | Ozugur |
| 7,336,670 B1 | 2/2008 | Calhoun et al. |
| 7,349,380 B2 | 3/2008 | Barker, Jr. et al. |
| 7,450,544 B2 | 11/2008 | Rue |
| 7,486,670 B2 | 2/2009 | Kinoshita et al. |
| 7,512,687 B2 | 3/2009 | Jung |
| 7,606,194 B2 | 10/2009 | He |
| 7,649,866 B2 | 1/2010 | Chari et al. |
| 7,733,829 B2 | 6/2010 | Lee et al. |
| 7,860,067 B2 | 12/2010 | Na et al. |
| 2001/0024443 A1 | 9/2001 | Alriksson et al. |
| 2002/0009066 A1 | 1/2002 | Shimizu et al. |
| 2002/0015395 A1 | 2/2002 | Karagiannis |
| 2002/0015396 A1 | 2/2002 | Jung |
| 2002/0021680 A1 | 2/2002 | Chen |
| 2002/0026527 A1* | 2/2002 | Das et al. ............ 709/245 |
| 2002/0034166 A1 | 3/2002 | Barany et al. |
| 2002/0046287 A1 | 4/2002 | La Porta et al. |
| 2002/0057657 A1 | 5/2002 | La Porta et al. |
| 2002/0075844 A1 | 6/2002 | Hagen |
| 2002/0080752 A1 | 6/2002 | Johansson et al. |
| 2002/0094813 A1 | 7/2002 | Koshimizu et al. |
| 2003/0016655 A1 | 1/2003 | Gwon |
| 2003/0018810 A1 | 1/2003 | Karagiannis et al. |
| 2003/0035387 A1 | 2/2003 | Kim |
| 2003/0076837 A1 | 4/2003 | Whitehill et al. |
| 2003/0104813 A1 | 6/2003 | Julka et al. |
| 2003/0148777 A1 | 8/2003 | Watanabe et al. |
| 2003/0174709 A1 | 9/2003 | Shankar |
| 2003/0202505 A1 | 10/2003 | Ozugur |
| 2003/0235176 A1 | 12/2003 | Zhang et al. |
| 2004/0005884 A1 | 1/2004 | Nieminen et al. |
| 2004/0013099 A1* | 1/2004 | O'Neill ............ 370/338 |
| 2004/0022212 A1 | 2/2004 | Chowdhury et al. |
| 2004/0023653 A1 | 2/2004 | O'Neill |
| 2004/0024901 A1* | 2/2004 | Agrawal et al. ............ 709/238 |
| 2004/0034705 A1 | 2/2004 | Focsaneanu |
| 2004/0043791 A1 | 3/2004 | Reddy |
| 2004/0047322 A1* | 3/2004 | O'Neill ............ 370/338 |
| 2004/0063455 A1 | 4/2004 | Eran et al. |
| 2004/0066760 A1 | 4/2004 | Thubert et al. |
| 2004/0071109 A1 | 4/2004 | Herle et al. |
| 2004/0082330 A1 | 4/2004 | Marin |
| 2004/0114559 A1* | 6/2004 | Wang ............ 370/338 |
| 2004/0133684 A1 | 7/2004 | Chan et al. |
| 2004/0185852 A1 | 9/2004 | Son et al. |
| 2004/0213181 A1 | 10/2004 | Grech et al. |
| 2004/0213260 A1* | 10/2004 | Leung et al. ............ 370/395.3 |
| 2004/0242233 A1* | 12/2004 | Lutgen ............ 455/445 |
| 2004/0259567 A1 | 12/2004 | Valko et al. |
| 2005/0047399 A1 | 3/2005 | Lee et al. |
| 2005/0057499 A1 | 3/2005 | Lee et al. |
| 2005/0088994 A1 | 4/2005 | Maenpaa et al. |
| 2005/0113091 A1 | 5/2005 | Rodriguez et al. |
| 2005/0122946 A1 | 6/2005 | Won |
| 2005/0128975 A1 | 6/2005 | Kobayashi et al. |
| 2005/0135286 A1 | 6/2005 | Nurminen et al. |
| 2005/0135422 A1 | 6/2005 | Yeh |
| 2005/0148368 A1 | 7/2005 | Scheinert et al. |
| 2005/0163080 A1 | 7/2005 | Suh et al. |
| 2005/0180372 A1 | 8/2005 | Cho et al. |
| 2005/0185632 A1 | 8/2005 | Draves, Jr. et al. |
| 2005/0213546 A1 | 9/2005 | Reitter et al. |
| 2005/0232286 A1* | 10/2005 | Lee et al. ............ 370/401 |
| 2006/0104247 A1 | 5/2006 | Dommety et al. |
| 2006/0112183 A1 | 5/2006 | Corson et al. |
| 2006/0142034 A1 | 6/2006 | Wentink et al. |
| 2006/0193272 A1 | 8/2006 | Chou et al. |
| 2007/0115883 A1 | 5/2007 | Narayanan et al. |
| 2008/0167037 A1 | 7/2008 | Bedekar et al. |
| 2008/0186964 A1 | 8/2008 | Bedekar et al. |
| 2008/0192663 A1 | 8/2008 | Bedekar et al. |
| 2008/0194271 A1 | 8/2008 | Bedekar et al. |
| 2008/0205362 A1 | 8/2008 | Bedekar et al. |
| 2008/0240037 A1 | 10/2008 | Bedekar et al. |

FOREIGN PATENT DOCUMENTS

| | | |
|---|---|---|
| EP | 1404143 A2 | 3/2004 |
| EP | 1263182 B1 | 12/2008 |
| WO | 0045560 | 8/2000 |
| WO | 03049377 A1 | 6/2003 |
| WO | 2004073324 A2 | 8/2004 |
| WO | 2004073325 A2 | 8/2004 |

OTHER PUBLICATIONS

Chuah, M.C. et al.: Mobile Virtual Private Dial-up Services:, Bell Labs Technical Journal; Bell Laboratories; U.S., vol. 4, No. 3, Jul. 1999, pp. 51-72.

Perkins, Charles et al: "IMHP: A Mobile Host Protocol for the Internet", in Proceedings of INET'94/JENC5, (1994), all pages.

Wu, Chun-Hsin et al.: "Bi-direction Route Optimization in Mobile IP over Wireless LAN", Vehicular Technology Conference, 2002, Proceedings. VTC 2002-Fall, 2002 IEEE 56th, all pages.

Perkins, C.: "IP Mobility Support for IPv4", Network Working Group, Request for Comments: 3344, Nokia Research Center, Aug. 2002, all pages.

R. Caceres and V.N. Padmanbhan: "Fast and Scalable Wireless Handoffs in Support of Mobile Internet Audio", ACM J. Mobile Net. and Appl., v3, No. 4, Dec. 1998, all pages.

Gustafsson Eva et al.: "Mobile IPv4 Regional Registration", draft-ietf-mobileip-reg-tunnel-09.txt, Mobile IP Working Group Internet Draft, Jun. 25, 2004, all pages.

Ericsson, "low Latency Handoffs in Mobile IPv4", Network Working Group, Internet-Draft, Expires Dec. 2004, Jun. 2004, draft-ietf-mobileip-lowlatency-handoffs-v4-09.txt, all pages.

Soliman, Hesham et al.: Hierarchical Mobile IPv6 Mobility management (HMIPv6), draft-ietf-mipshop-hmipv6-03.txt, Network Working Group, Expires: Apr. 2005, Oct. 2004, all pages.

Kempf, James et al.: "Post-handover Mobile Initiated Tunneling for Fast Mobile IPv4 Handover", draft-kempf-mobileip-postmit-handover-00.txt, Expires: Jun. 2002, all pages.

Fathi, Hanane et al.: "Mobility Management for VoIP in 3G Systems: Evaluation of Low-Latency Handoff Schemes", IEEE Wireless Communications, Apr. 2005, 1536-1284/05, pp. 96-104.

Perkins, C: "IP Mobility Support", Network Working Group, Request for Comments: 2002 IBM, Oct. 1996, all pages.

(56) References Cited

OTHER PUBLICATIONS

Translation of the Official Communication from the German Patent and Trademark Office date Aug. 19, 2011, all pages.
German Patent and Trademark Office, Office Action for German Patent Application No. 10 2006 001 7101 dated Sep. 6, 2012, 8 pages.
Andy Wilton, "The Benefits of ALL-IP Networks", Presentation for the 3G Mobile Summit, Brussels, Jun. 2001. http://ipv6tf.org/PublicDocuments/ThebenefitsofALL-IPnetworks.pdf [accessed on Aug. 16, 2012].
Ramjee, R. et al. "IP-base access network infrastructure for next-generation wireless data networks", Personal Communications, IEEE, vol. 7 (4) 34-41, Aug. 2000; DOI:10.1109/98.863994.
Ulrich Trick et al. "Modeling heterogeneous telecommunications networks" ITG Technical Report, Presentation at the 10th ITG Symposium from Jun. 1, 2005 to Jun. 2, 2005 in Osnabrück, p. 41-49, Jun. 2005.
United States Patent and Trademark Office, "Non-Final Rejection" for U.S. Appl. No. 11/913,944 dated Nov. 29, 2012, 15 pages.
United States Patent and Trademark Office, "Non-Final Rejection" for U.S. Appl. No. 11/913,942 dated Nov. 28, 2012, 16 pages.
United States Patent and Trademark Office, "Non-Final Rejection" for U.S. Appl. No. 11/913,944 dated Oct. 21, 2013, 14 pages.
Government of India, Patent Office, Examination Report for Indian Patent Application No. 537/KOL/2005, dated Jun. 4, 2014 (1 page).
Patent Cooperation Treaty; International Search Report and Written Opinion of the International Searching Authority for International Patent Application No. PCT/US2006/023726; Feb. 28, 2007 (7 pages).

\* cited by examiner

METHOD AND APPARATUS FOR FACILITATE COMMUNICATIONS USING SURROGATE AND CARE-OF-INTERNET PROTOCOL ADDRESSES

RELATED APPLICATIONS

This application relates to the following patent applications as were filed on even date herewith (wherein the contents of such patent applications are incorporated herein by this reference):

ADDRESS RESOLUTION PROTOCOL-BASED WIRELESS ACCESS POINT METHOD AND APPARATUS (U.S. patent application Ser. No. 11/913,940);

METHOD AND APPARATUS FOR REDUCING LATENCY DURING WIRELESS CONNECTIVITY CHANGES (U.S. patent application Ser. No. 11/913,936);

METHOD AND APPARATUS TO FACILITATE MOBILE STATION COMMUNICATIONS USING INTERNET PROTOCOL-BASED COMMUNICATIONS (U.S. patent application Ser. No. 11/913,944);

METHOD, APPARATUS, AND SYSTEM FOR ESTABLISHING A DIRECT ROUTE BETWEEN AGENTS OF A SENDER NODE AND A RECEIVER NODE (U.S. patent application Ser. No. 11/913,935);

SYSTEM AND METHOD FOR PROVIDING A DISTRIBUTED VIRTUAL MOBILITY AGENT (U.S. patent application Ser. No. 11/913,937); and SYSTEM AND METHOD FOR PAGING AND LOCATION UPDATE IN A NETWORK (U.S. patent application Ser. No. 11/913,942).

TECHNICAL FIELD

This invention relates generally to networked communications and more particularly to communication systems characterized by a plurality of hierarchically layered mobility management agents.

BACKGROUND

One-way and two-way wireless communications are a relatively well-understood area of endeavor. In many cases, various network elements comprise an infrastructure that supports the communications needs of one or more mobile stations. These communications needs can comprise voice calls, data communications, and so forth. In many cases, modern communications networks comprise a large number of geographically differentiated wireless access points that essentially define the network's edge. Such geographic differentiation, in turn, facilitates significant reuse of various network resources such as radio frequency bearer channels, control channels, time slots, spreading codes, and so forth. Aggressive reuse of such resources then facilitates viably supporting a relatively large user population.

Such communication networks, however, have become ever more complex. Pursuant to one approach, geographically parsed points of access couple to one another and to a plurality of mobility management agents (such as, but not limited to, Home Agents) that are hierarchically differentiated from those wireless access points and, in many cases, from each other as well. These coupled relationships serve to facilitate various mobility management functions such as, but not limited to:

Connected mode mobility (for example, handover of a presently communicating mobile station from one wireless access point to another);

Idle mode mobility (for example, supporting and effecting location updates for and/or paging of supported mobile stations);

Subscriber and call session management (for example, authentication, authorization, and accounting services, policy administration, and so forth);

Radio frequency resource management (for example, resource scheduling, admission control, dynamic quality of service management, load balancing, and so forth); to name but a few.

Unfortunately, while such an architectural approach indeed successfully supports the intended service capability, there are issues of concern. For example, such proposals often tend to present significant scaling difficulties and barriers to feature growth and expansion. The end result represents increased costs (both for service providers and for subscribers) as pertain both to the infrastructure and to the mobile stations themselves, rapid obsolescence, and/or delayed expansion or upgrades with respect to capacity and/or features.

BRIEF DESCRIPTION OF THE DRAWINGS

The above needs are at least partially met through provision of the method and apparatus to facilitate communications using surrogate and care-of Internet Protocol addresses described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein. For example, the expression "Internet Protocol" will be readily understood to refer generally to all presently existing and hereafter developed Internet protocols including, but not limited to, IPv4 and IPv6.

DETAILED DESCRIPTION

Generally speaking, pursuant to these various embodiments, a wireless access point (and in particular a wireless access point having native mobility agent functionality) facilitates a communication need of a mobile station with respect to a communication system that comprises a plurality of hierarchically layered mobility management agents (such as, but not limited to, Mobile Internet Protocol Home Agents). In a preferred approach, the wireless access point acquires a surrogate Internet Protocol address to use on behalf of the mobile station and then uses that surrogate Internet Protocol address as a surrogate address for the mobile station and its own Internet Protocol address as a care-of address for the mobile station when interacting with a first mobility management agent to support the communication need of the mobile station.

Pursuant to one approach, the wireless access point provides the surrogate Internet Protocol address by detecting the mobile station (as when, for example, the mobile station becomes attached to the wireless access point), acquiring the surrogate Internet Protocol address (from, for example, a local Dynamic Host Configuration Protocol (DHCP) Server), and transmitting a registration request (such as a Mobile Internet Protocol registration request) to that first mobility management agent. In a preferred approach, that registration request presents the surrogate Internet Protocol address as a surrogate address for the mobile station and the Internet Protocol address of the wireless access point as a care-of address for the mobile station. It may be noted that the surrogate Internet Protocol address need not be the same as a home address assigned to the mobile.

So configured, the wireless access point can establish a data path between itself and the first mobility management agent to support the back-and-forth transmission of both real time and non-real time data packets as correspond to the mobile station. If necessary and/or as desired, a similar approach can be employed with other mobility management agents of other hierarchical layers of the communication network. Accordingly, those skilled in the art will appreciate the relative ease by which these teachings can be scaled upwardly to accommodate essentially any sized communication network.

These teachings are also applicable to handover scenarios and other mobility management events. When handing over the mobile station to another wireless access point that shares the first mobility management agent with the aforementioned wireless access point (as when, for example, both wireless access points share a common subnet), it may be possible to persist the surrogate Internet Protocol address by communicating that address to the second wireless access point. This, in turn, can avoid the necessity of altering or re-defining any already-existing data paths or tunnels associated with mobility management agents serving higher levels within the hierarchy of the communication system.

When handing over the mobile station to a wireless access point that does not share the same mobility management agent (as when, for example, the two wireless access points do not share a common subnet and the resources thereof), the wireless access point that receives the hand over can benefit from these teachings by acquiring a surrogate Internet Protocol address as suggested above and employing that surrogate address along with its own Internet Protocol address (again as a care-of address) when interacting with its own mobility management agent to establish a new data tunnel on behalf of the mobile station. This, in turn, may further entail interactions with mobility management agents serving higher levels within the hierarchy of the communication system in order to establish a data path from the mobile station to the desired end point (such as the Home Agent that serves the mobile station's home subnet).

Again, those skilled in the art will appreciate that these solutions are readily scalable. In many instances, these approaches also serve to establish and/or maintain the necessary data paths in a manner that tends to minimize, at least to some extent, the tearing down and building up of at least some data tunnels, as at least some existing data tunnels that serve to connect various layers of the communication system are often reusable.

Figure 1:
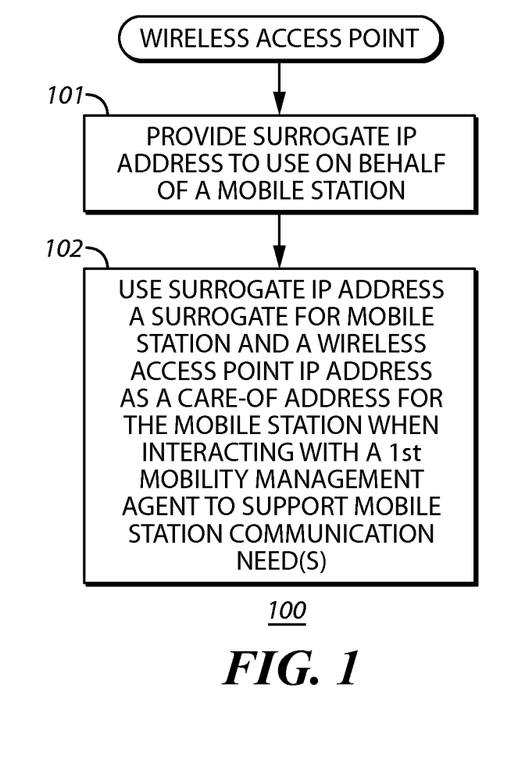
FIG. 1 comprises a flow diagram as configured in accordance with various embodiments of the invention.

These and other benefits may become clearer upon making a thorough review and study of the following detailed description. Referring now to the drawings, and in particular to FIG. 1, a process 100 suitable for use by a wireless access point in a communication system to facilitate one or more mobile station communication needs (where that communication system comprises a plurality of hierarchically layered mobility management agents) comprises the provision 101 and use 102 of a surrogate Internet Protocol (IP) address on behalf of the mobile station. The communication need itself can comprise any of a wide variety of presently known or hereafter-developed communication needs, such as (but not limited to) a need to transmit or to receive a data packet, a need to receive a page, a need to respond to a page, a need to perform a location update, a need to perform a routing area update, a need to effect a hand over from one wireless access point to another wireless access point, and so forth, to name but a few.

Provision 101 of the surrogate Internet Protocol address (and referring now momentarily to FIG. 2) will preferably comprise detecting 201 the mobile station (when, for example, the mobile station becomes attached to the wireless access point in accordance with well understood prior art practice) and then acquiring 202 the surrogate Internet Protocol address in response to such detection. This acquisition 202 can be facilitated in numerous ways. By one approach, the wireless access point can acquire a local Internet Protocol address from a local subnet resource (such as a local Dynamic Host Control Protocol (DHCP) server) in accordance with present practice.

Figure 2:
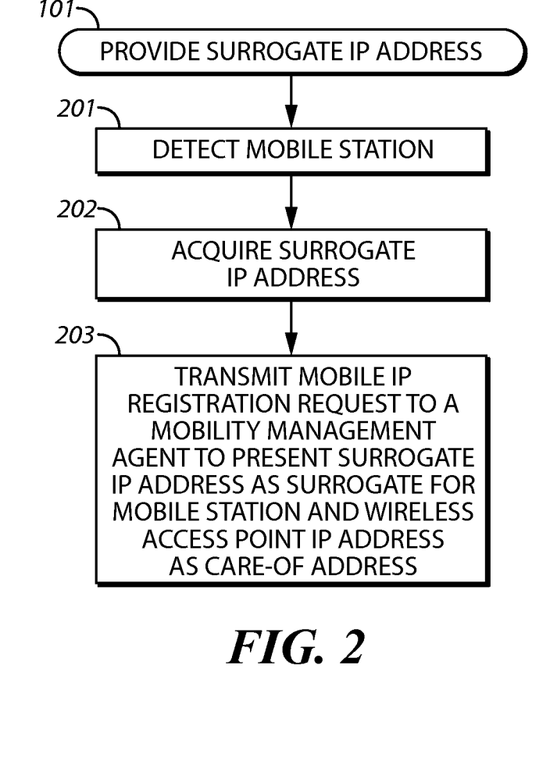
FIG. 2 comprises a flow diagram as configured in accordance with various embodiments of the invention.

The wireless access point can then, in a preferred approach, transmit 203 a Mobile Internet Protocol registration request (as is known in the art) to a mobility management agent to present the surrogate Internet Protocol address as a surrogate for the mobile station and the wireless access point's own Internet Protocol address as a care-of address for the mobile station.

In a preferred approach, the mobility management agent will typically comprise a local resource that is directly associated with the wireless access point's local subnet. For the purposes of illustration, this mobility management agent can comprise, for example, a local Home Agent.

In some cases, of course, this local Home Agent will not comprise the Home Agent for the mobile station's own home subnet. In such a case, the Home Agent for the mobile station's home subnet comprises a hierarchically different mobility management agent as viewed with respect to the local Home Agent. By these teachings, and in a preferred approach, in such a case the wireless access point can then transmit another Mobile Internet Protocol registration request, this time to the Home Agent for the mobile station's home subnet. This Mobile Internet protocol registration request will preferably present the mobile station's home Internet Protocol address (wherein it shall be understood herein that a "home" address can comprise a traditional home address as is assigned to that mobile station or a primary Internet Protocol address as is otherwise associated with that mobile station) as a home address and the surrogate Internet Protocol address as a care-of address.

So configured, and referring again to FIG. 1, this surrogate Internet Protocol address is then used 102, along with the wireless access point's own Internet Protocol address, when interacting with one or more mobility management agents (such as Home Agents) when supporting the communication needs of the mobile station.

As one illustration of such use, and referring again to the illustrative scenario presented earlier, the Home Agent for the mobile station will now tunnel all packets destined for the mobile station (which this Home Agent identifies by the mobile station's home Internet Protocol address and which again may comprise a previously assigned address or a more recently acquired address) to the surrogate Internet Protocol address first obtained by the wireless access point on behalf of the mobile station. In the above scenario, the local Home Agent (i.e., the Home Agent that comprises a part of the wireless access point's local subnet) will then use its information to further tunnel such packets to the wireless access point using the surrogate Internet Protocol address in the role of a home address and the wireless access point's own Internet Protocol address as a care-of address. The wireless access point can then decapsulate both tunnels and forward the packets to the mobile station based upon its earlier correlation of the acquired surrogate Internet Protocol address with the mobile station itself.

In many cases, of course, the hierarchical structure of the communication system will comprise more layers than those suggested above in the provided example. Notwithstanding such increased complexity, these same teachings are readily applied in such a setting. Those skilled in the art will appreciate that these teachings are deployable in such a context without presenting significant scaling problems. In general, with additional hierarchical layers (supporting a corresponding plurality of hierarchically layered mobility management agents) one can further acquire, for each level of the plurality of hierarchically layered mobility management agents save one level, a surrogate Internet Protocol address to again use as described above on behalf of the mobile station. The highest hierarchical layer mobility management agent will typically not benefit from itself acquiring such a surrogate Internet Protocol address and hence can be excluded from this practice in many instances.

The mobility management agent at each level of a plurality of hierarchically differentiated mobility management agents can then employ usage of these Internet Protocol addresses as described earlier to effect the establishment of corresponding tunnels to facilitate the passage of mobile station packets to and from the mobile station with respect to sources and targets that are external to the local subnet to which the mobile station is presently attached.

Figure 3:
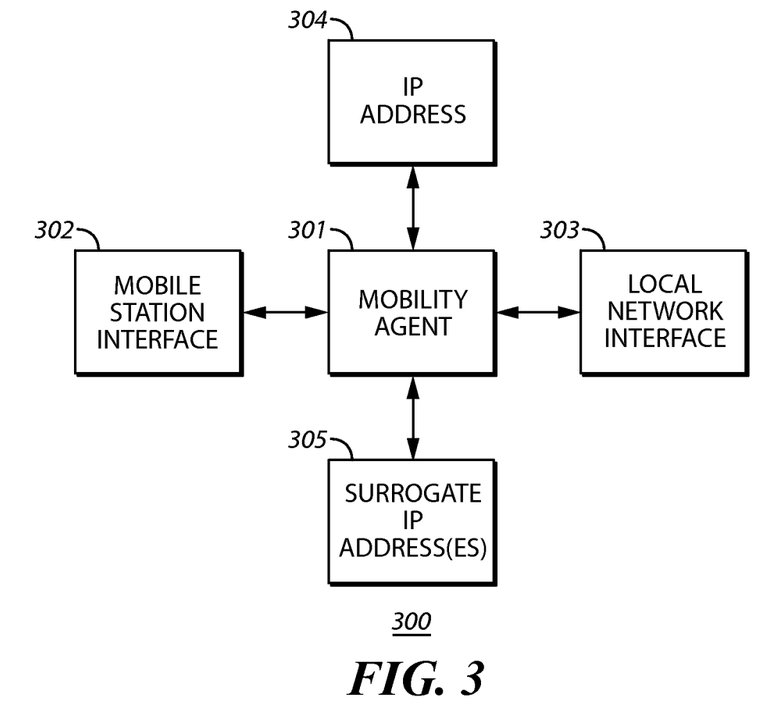
FIG. 3 comprises a block diagram as configured in accordance with various embodiments of the invention.

A wireless access point can be configured in any of many ways to participate in and otherwise facilitate such a process. Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 3, an illustrative approach to such a platform will now be provided.

In this illustrative embodiment, the wireless access point 300 comprises, in relevant part, a mobility agent 301. This mobility agent 301 operably couples, in turn, to a mobile station interface 302 (such as, for example, a wireless base station) and a local network interface 303 (where the local network may comprise, for example, an Internet Protocol-compatible subnet as is known in the art). In a preferred approach this mobility agent 301 also has access to an Internet Protocol address 304 (comprising, for example, its own Internet Protocol address) and one or more surrogate Internet Protocol addresses 305 (multiple such surrogate Internet Protocol addresses may be provided when supporting, for example, the communication needs of a corresponding plurality of mobile stations or in settings where multiple surrogate addresses are employed with a single mobile station). These addresses can be stored, for example, in one or more memories using well understood prior art techniques in this regard.

In a preferred approach, the mobility agent 301 is configured and arranged (for example, via suitable programming using prior art practice in this regard) to selectively support the creation of a tunnel with a first mobility management agent (such as, for example, a local Home Agent) using a surrogate Internet Protocol address on behalf of a given mobile station and the wireless access point's own Internet Protocol address to support the mobile station's communication need or needs in accordance with the previously described processes. In particular, the mobility agent 301 can serve to acquire a surrogate Internet Protocol address for a given mobile station and to effect the usage of that surrogate Internet Protocol address as described above.

Figure 4:
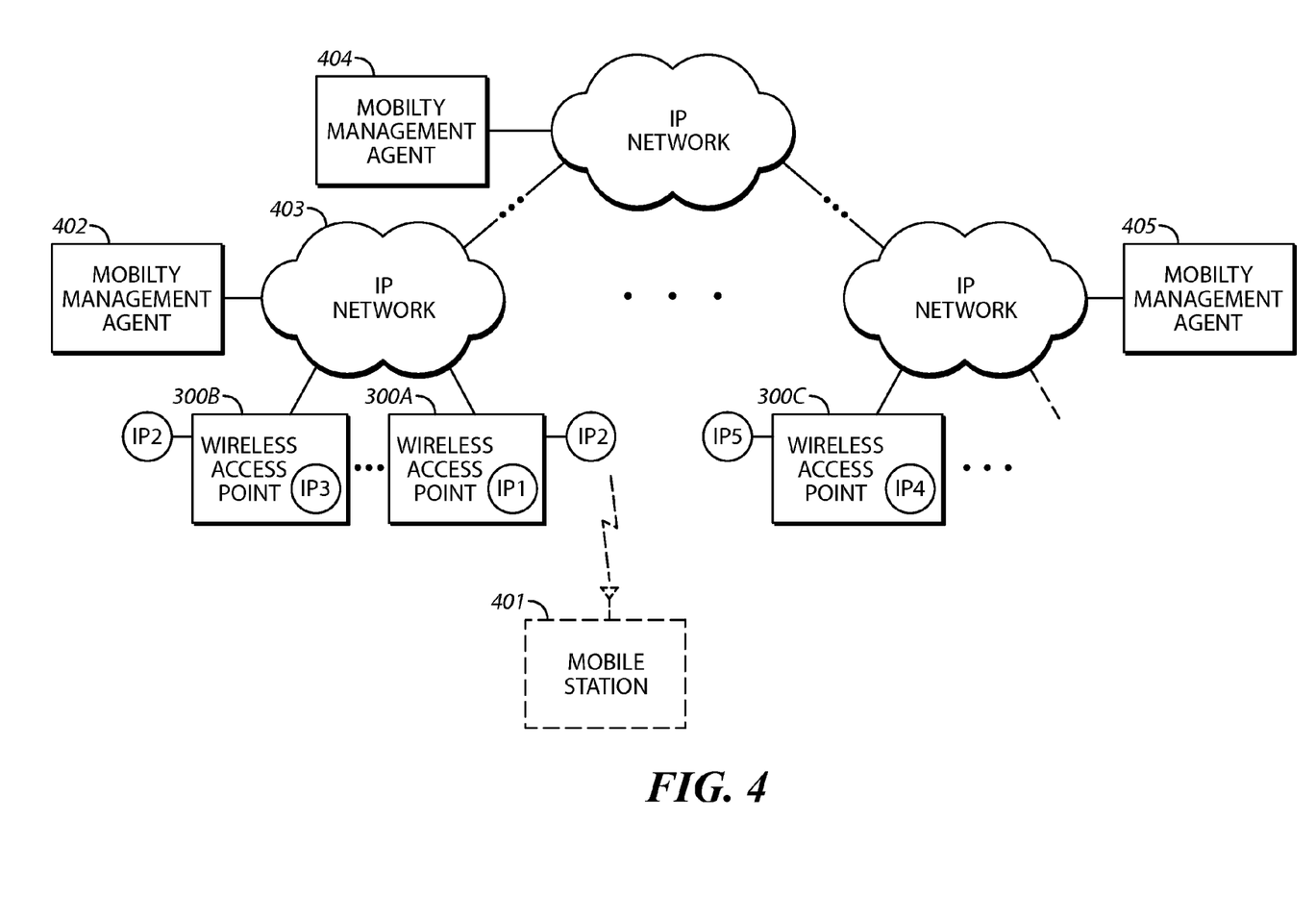
FIG. 4 comprises a block diagram as configured in accordance with various embodiments of the invention.

Referring now to FIG. 4, a number of examples will now be provided while making reference to a simple system illustration.

EXAMPLE 1

In this example, a mobile station 401 becomes attached to a first wireless access point 300A. This first wireless access point 300A has its own (likely previously acquired) Internet Protocol address IP1. In this example, regardless of whether the mobile station 401 is Mobile Internet Protocol proficient and in accordance with the teachings presented above, this first wireless access point now acquires a surrogate Internet Protocol address IP2 from a suitable local resource (for example, from a Dynamic Host Configuration Protocol Server (not shown) as may comprise a part of the local subnet that comprises the first wireless access point 300A itself).

Upon acquiring this surrogate Internet Protocol address IP2, the wireless access point 300A then transmits a Mobile Internet Protocol registration request to a local mobility management agent 402. In some instances, this mobility management agent also comprises a part of the local subnet that comprises this wireless access point 300A. In this embodiment, the local subnet fabric comprises a first Internet Protocol network 403 as is known in the art. The registration request presents the surrogate Internet Protocol address IP2 as a home address for the mobile station and the wireless access point's Internet Protocol address IP1 as a care-of address. The local mobility management agent 402 (which may comprise, for example, a local Home Agent) and this wireless access point 300A then establish a data tunnel via the Internet Protocol network 403 to carry data packets to (and optionally from if desired) the mobile station under the auspices of the addressing scheme described.

In this example, this local mobility management agent 402 is not the home mobility management agent, i.e. the mobility management agent on the subnet corresponding to the home address for this particular mobile station 401. Accordingly, and again in conformance with the teachings set forth above, the wireless access point 300A now transmits another Mobile Internet Protocol registration request to a home mobility management agent 404 as corresponds to this particular mobile station 401. This registration request presents the mobile station's home Internet Protocol address as a home address and the surrogate Internet Protocol address IP2 as a care-of address.

Accordingly, the home mobility management agent 404 will now tunnel packets destined to the mobile station's home Internet Protocol address to the local mobility management agent 402 using the surrogate Internet Protocol address IP2 as the destination. Upon receiving such a packet, the local mobility management agent 402 will use its own address correlations and further tunnel those packets to the wireless access point 300A. The latter will then decapsulate both tunnels and forward the packets on to the mobile station 401.

Those skilled in the art will appreciate that this approach permits a fully Internet Protocol-based infrastructure to compatibly interact with a non-Internet Protocol capable mobile station. Skilled practitioners will also understand and appreciate that this approach avoids the need to decapsulate data packets at network elements such as the local mobility management agent 402. Instead, all de-tunneling (including de-tunneling of multiple levels of tunnels-within-tunnels) occurs at the wireless access point; i.e., at a lowest layer within the hierarchically differentiated strata of the communication network itself.

EXAMPLE 2

In this next example, which might be viewed as a continuation of events beyond that described in EXAMPLE 1 presented above, the mobile station 401 has moved and is now attached to a second wireless access point 300B. In this example, this second wireless access point 300B also comprises a part of the same subnet as includes the original wireless access point 300A. In this example, this second wireless access point has its own Internet Protocol address IP3.

As per the teachings described above, the second wireless access point 300B can now use that previously acquired surrogate Internet Protocol address IP2 on behalf of the mobile station 401 as and when the latter hands over to the second wireless access point 300B.

The second wireless access point 300B then transmits a Mobile Internet Protocol registration request to the mobility management agent 402. Again, in accordance with these teachings, this registration request presents the surrogate Internet Protocol address IP2 as a home address and the Internet Protocol address IP3 of the second wireless access point 300B as a care-of address. This permits establishing a corresponding data tunnel as between the first mobility management agent 402 and the second wireless access point 300B to again support the communication needs of the mobile station 401.

In a preferred approach, the previously established tunnel between the first wireless access point 300A and the first mobility management agent 402 can now be torn down. Those skilled in the art will appreciate, however, that the tunnel as was previously established with the home mobility management agent 404 need not be altered. Instead, that network element can continue to operate as before and data packets destined for the mobile station 401 will be effectively routed to the second wireless access point 300B where they can be decapsulated and forwarded to the mobile station 401.

EXAMPLE 3

In this example, the mobile station 401 has roamed beyond the coverage area of the wireless access points as were previously discussed and is now attached to a third wireless access point 300C that comprises a part of a different subnet. As before, this third wireless access point 300C has its own corresponding Internet Protocol address IP4. Accordingly, in a preferred approach, this third wireless access point 300C will essentially repeat the steps set forth in the first example above. This includes acquiring a new surrogate Internet Protocol address IP5 from a local resource and using that surrogate Internet Protocol address IP5 and its own Internet Protocol address IP4 with both a local mobility management agent 405 and the home mobility management agent 404 for the mobile station to establish corresponding data tunnels as described above.

Those skilled in the art will appreciate that these teachings are generally applicable without requiring reprogramming or other alteration of the mobile stations themselves. In particular, these teachings can be effectuated in a relatively transparent manner to the mobile station. As a result, these teachings can be employed with Internet Protocol and Mobile Internet Protocol capable mobile station, but are also useful when employed with non-Mobile Internet Protocol and/or non-Internet Protocol capable mobile stations. Those skilled in the art will also appreciate that these teachings are readily employed to good effect in a network that comprises multiple hierarchical levels of mobility management agents.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for use by a wireless access point in a communication system to facilitate at least one communication need of a mobile station, wherein the communication system comprises a plurality of hierarchically layered mobility management agents, the method comprising:
   providing, by the wireless access point, a plurality of surrogate Internet Protocol addresses including a first surrogate Internet Protocol address acquired for use on behalf of the mobile station for a first level of the plurality of hierarchically layered mobility management agents and a second surrogate Internet Protocol address acquired for use on behalf of the mobile station for a second level of the plurality of hierarchically layered mobility management agents;
   using, by the wireless access point when interacting with a first mobility management agent of the plurality of hierarchically layered mobility management agents, the first acquired surrogate Internet Protocol address as a surrogate Internet Protocol address for the mobile station and one of the plurality of surrogate Internet Protocol addresses as was acquired for a next lower level of the plurality of hierarchically layered mobility management agents as a care-of address for the mobile station to support the communication need of the mobile station, wherein the first mobility management agent is associated with a subnet that includes the wireless access point; and
   using, by the wireless access point, one of the first and second acquired surrogate Internet Protocol addresses as a care-of address and a home Internet Protocol address of the mobile station as a home address for the mobile station when interacting with a second mobility management agent of the plurality of hierarchically layered mobility management agents to support the communication need of the mobile station, wherein the second mobility management agent is remote to the subnet.

2. The method of claim 1 wherein the communication need of the mobile station comprises at least one of:
   a need to receive a data packet;

a need to transmit a data packet;
a need to receive a page;
a need to respond to a page;
a need to perform a location update;
a need to perform a routing area update;
a need to effect a handover from one wireless access point to another wireless access point.

3. A method for use by a wireless access point in a communication system to facilitate at least one communication need of a mobile station, wherein the communication system comprises a plurality of hierarchically layered mobility management agents, the method comprising:

providing, by the wireless access point, a plurality of surrogate Internet Protocol addresses including a first surrogate Internet Protocol address acquired for use on behalf of the mobile station for a first level of the plurality of hierarchically layered mobility management agents and a second surrogate Internet Protocol address acquired for use on behalf of the mobile station for a second level of the plurality of hierarchically layered mobility management agents, wherein one level of the plurality of hierarchically layered mobility management agents for which a surrogate Internet Protocol address is not acquired comprises a highest hierarchical layer mobility management agent;

using, by the wireless access point, the first acquired surrogate Internet Protocol address as a surrogate address for the mobile station and a wireless access point Internet Protocol address as a care-of address for the mobile station when interacting with a first mobility management agent of the plurality of hierarchically layered mobility management agents to support the communication need of the mobile station, wherein the first mobility management agent is associated with a subnet that includes the wireless access point; and using, by the wireless access point, one of the first and second acquired surrogate Internet Protocol addresses as a care-of address and a home Internet Protocol address of the mobile station as a home address for the mobile station when interacting with a second mobility management agent of the plurality of hierarchically layered mobility management agents to support the communication need of the mobile station, wherein the second mobility management agent is remote to the subnet.

4. The method of claim 3 wherein providing, by the wireless access point, the plurality of surrogate Internet Protocol addresses further comprises:

detecting the mobile station;
acquiring the plurality of surrogate Internet Protocol addresses;
transmitting a Mobile Internet Protocol registration request to the first mobility management agent, the first mobility management agent being part of a first hierarchical layer of the communication system, which request presents the first acquired surrogate Internet Protocol address as a surrogate address for the mobile station and the wireless access point's own Internet Protocol address to be used as a care-of address.

5. A wireless access point for use in a communication system having a plurality of hierarchically layered mobility management agents, comprising:

a mobile station interface;
a plurality of surrogate Internet Protocol addresses including a first surrogate Internet Protocol address acquired for use on behalf of a first mobile station for a first level of the plurality of hierarchically layered mobility management agents and a second surrogate Internet Protocol address acquired for use on behalf of the first mobile station for a second level of the plurality of hierarchically layered mobility management agents, wherein the first mobile station may be one or more of:
Mobile Internet Protocol capable;
non-Mobile Internet Protocol capable; and
non-Internet Protocol capable;
a local network interface; and
a mobility agent operably coupled to the mobile station interface and the local network interface and being configured to selectively support creation of a first tunnel with a first mobility management agent of the plurality of hierarchically layered mobility management agents to facilitate a communication for the first mobile station using the first acquired surrogate Internet Protocol address on behalf of the first mobile station, wherein the first mobility management agent is associated with a subnet that includes the wireless access point, and to provide one of the first and second acquired surrogate Internet Protocol addresses as a care-of address and a home Internet Protocol address of the first mobile station as a home address for the first mobile station when interacting with a second mobility management agent of the plurality of hierarchically layered mobility management agents, wherein the second mobility management agent is remote to the subnet,
wherein one level of the plurality of hierarchically layered mobility management agents for which a surrogate Internet Protocol address is not acquired comprises a highest hierarchical layer mobility management agent.

6. The wireless access point of claim 5 wherein the communication is sourced by or directed to a source or destination external to a local subnet.

7. The wireless access point of claim 5 wherein the mobility agent is configured to:

acquire the plurality of surrogate Internet Protocol addresses; and
use the first acquired surrogate Internet Protocol address as a home address for the first mobile station and an Internet Protocol address for the wireless access point as a care-of address when participating in creating the first tunnel between the mobility agent of the wireless access point and the first mobility management agent.

8. The wireless access point of claim 7 wherein the mobility agent is further configured to:

facilitate establishment of a second tunnel on behalf of the first mobile station between the second mobility management agent and the first mobility management agent.

9. A method for use in a communication system to facilitate at least one communication need of a mobile station, wherein the communication system comprises a plurality of hierarchically layered mobility management agents, the method comprising:

providing at a first wireless access point a first surrogate Internet Protocol address to use on behalf of the mobile station, wherein the first wireless access point also has its own first wireless access point Internet Protocol address;

having the first wireless access point provide the first surrogate Internet Protocol address to use on behalf of the mobile station and the first wireless access point Internet Protocol address as a care-of address to a first mobility management agent;

using, by the first wireless access point, the first surrogate Internet Protocol address and the care-of address to facilitate provisioning a first tunnel between a mobility agent in the first wireless access point and the first mobility management agent, wherein the first mobility management agent is associated with a subnet that includes the first wireless access point;

using, by the first wireless access point, the first tunnel to convey data packets as correspond to the mobile station;

providing, by the first wireless access point, the first surrogate Internet Protocol address as a care-of address and a home Internet Protocol address of the mobile station as a home address for the mobile station to a second mobility management agent to support the communication need of the mobile station, wherein the second mobility management agent is remote to the subnet;

providing, at a second wireless access point when the mobile station becomes attached to the second wireless access point, a second surrogate Internet Protocol address to use on behalf of the mobile station, wherein the second wireless access point has its own second wireless access point Internet Protocol address, and wherein the second surrogate Internet Protocol address is identical to the first surrogate Internet Protocol address;

having the second wireless access point provide the second surrogate Internet Protocol address as a surrogate address for the mobile station and the second wireless access point Internet Protocol address as a second care-of address to the second mobility management agent;

using the second surrogate Internet Protocol address and the second care-of address to facilitate provisioning a second tunnel between a mobility agent in the second wireless access point and the second mobility management agent, comprising using the second surrogate Internet Protocol address and the second care-of address to facilitate provisioning the second tunnel between the mobility agent in the second wireless access point and the second mobility management agent without also requiring alteration of a third tunnel as previously established on behalf of the mobile station with a next hierarchical level mobility management agent that is positioned at a hierarchically distinct layer with respect to the first mobility management agent; and using the second tunnel to convey data packets as correspond to the mobile station.

10. The method of claim 9 further comprising:

using the second surrogate Internet Protocol address as a tunnel end-point to facilitate provisioning the third tunnel with a next hierarchical level mobility management agent that is positioned at a hierarchically distinct layer with respect to the second mobility management agent;

using the third tunnel to convey data packets as correspond to the mobile station.

11. The method of claim 9, wherein the second mobility management agent is different than the first mobility management agent and wherein the second mobility management agent has its own corresponding Internet Protocol address.

* * * * *